UNITED STATES PATENT OFFICE.

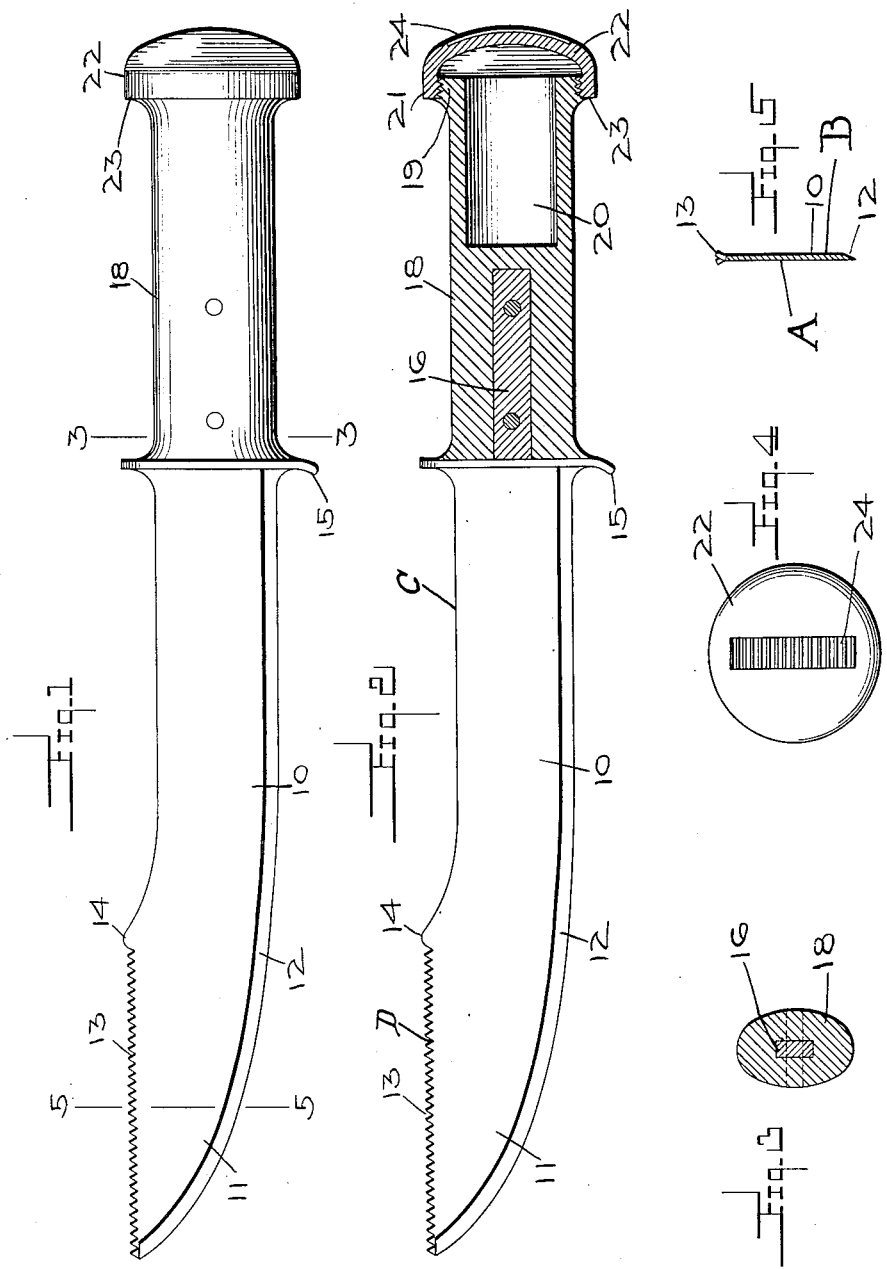

FRANK L. PUTNEY, OF SUNSHINE, WYOMING.

SKINNING AND DISSECTING KNIFE.

No. 912,411.      Specification of Letters Patent.      Patented Feb. 16, 1909.

Application filed May 11, 1908. Serial No. 432,172.

*To all whom it may concern:*

Be it known that I, FRANK L. PUTNEY, a citizen of the United States, residing at Sunshine, in the county of Bighorn and State of Wyoming, have invented certain new and useful Improvements in Skinning and Dissecting Knives, of which the following is a specification.

This invention relates to the class of butchering, and more particularly to skinning and dissecting knives, and has for an object to provide a device of this character which may be used as a combined instrument, and which will be especially adapted for use by hunters.

A further object of this invention is to provide a knife of the above described character with a handle adapted to contain matches, and arranged to hold the same proof against moisture.

Other objects and advantages will be apparent from the following description and it will be understood that changes in the specific structure shown and described may be made within the scope of the claim without departing from the spirit of the invention.

In the drawings forming a portion of this specification, and in which like characters of reference indicate similar parts in the several views, Figure 1 is a side view of the present invention, Fig. 2 is a similar view the handle being shown in sections, Fig. 3 is a transverse sectional view on the line 3—3 of Fig. 1, Fig. 4 is an end view looking toward the handle, Fig. 5 is a sectional view on the line 5—5 of Fig. 1.

Referring now to the drawings, there is shown a knife including a blade 10, having its forward edge portion beveled in one direction only as shown at 12, to present a knife edge. There are thus two faces A and B the latter having the beveled portion 12. The rearward edge of the blade is shown at C, and at its outer end the blade is curved rearwardly, as shown at 11, the rearwardly curved portion having a straight edge D extended in a line parallel with the line of the edge C but rearwardly thereof. The edge D is provided with a series of saw teeth 13, as shown, and at its inner end there is a stop 14. At its inner end, the blade 10 is provided with a handle 18, hereinafter described, and at the union of the blade and handle, is a guard 15 projecting beyond the forward cutting edge of the blade as shown.

The blade is provided with a shank 16, and riveted thereto there is shown the handle 18 preferably formed of metal, and which comprises an elongated member having an externally threaded portion at its outer end as shown at 19. The handle is provided with a chambered portion 20 which opens outwardly of the outer end of the handle and which is thus adapted to contain a quantity of matches. The threaded portion of the handle thus receives an internally threaded portion 21 of a cap 22 having an annular flanged portion 23 to prevent displacement of the hand of the operator from the handle. Upon the outer side the cap is provided with a coating of abrasive material or the like 24 for use as a match striker.

It will thus be seen that a simple, cheap and effective knife is provided, and by the provision of the knife edge 12, which is beveled in one direction it is obvious that the blade may be placed next to the hide in skinning thereby holding the cutting edge away from the hide and lessening the liability of cutting the same. The saw edge may be effectively used for opening up between the hind and front quarters, and materially assists in the cutting of bones or the like. It will be observed that when using the saw portion of the present instrument, the operation of the device is facilitated by the lateral turning of the outer end of the knife which brings the saw piece into a line outwardly of the edge C of the knife. As will be observed, the stop 14 prevents movement of the knife during the sawing operation to bring the edge C against the portion being sawed, and the stop 15 prevents the slipping of the hand of the user over the cutting edge of the knife when the sawing operation is being performed.

What is claimed is:—

A skinning and dissecting knife comprising the blade 10 having the forward beveled cutting edge 12 and the straight rearward edge C and having the rearwardly turned outer end portion terminating in the straight edge D located in a line outwardly of the edge C and provided with the saw teeth 13, said blade having the stop 14 at the inner end of the edge D, the handle 18 carried at the inner end of the blade and the guard 15 located at the union of the blade and handle and extending outwardly beyond the cutting edge 12.

In testimony whereof I affix my signature, in presence of two witnesses.

FRANK L. PUTNEY.

Witnesses:
H. E. CHEESEMAN,
BELLE L. CHEESEMAN.